US012426080B2

United States Patent
Ganesan et al.

(10) Patent No.: US 12,426,080 B2
(45) Date of Patent: Sep. 23, 2025

(54) PRIORITIZATION OF OVERLAPPING SL AND UL TRANSMISSIONS

(71) Applicant: Lenovo (Singapore) PTE. LTD., New Tech Park (SG)

(72) Inventors: Karthikeyan Ganesan, Kronberg im Taunus (DE); Prateek Basu Mallick, Dreieich (DE); Joachim Loehr, Wiesbaden (DE); Alexander Johann Maria Golitschek Edler von Elbwart, Darmstadt (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 355 days.

(21) Appl. No.: 17/914,717

(22) PCT Filed: Mar. 24, 2021

(86) PCT No.: PCT/IB2021/052455
§ 371 (c)(1),
(2) Date: Sep. 26, 2022

(87) PCT Pub. No.: WO2021/191823
PCT Pub. Date: Sep. 30, 2021

(65) Prior Publication Data
US 2023/0354407 A1 Nov. 2, 2023

Related U.S. Application Data

(60) Provisional application No. 62/994,151, filed on Mar. 24, 2020.

(51) Int. Cl.
*H04W 72/566* (2023.01)
*H04W 72/02* (2009.01)

(52) U.S. Cl.
CPC ......... *H04W 72/569* (2023.01); *H04W 72/02* (2013.01)

(58) Field of Classification Search
CPC ........................... H04W 72/569; H04W 72/02
See application file for complete search history.

(56) References Cited

U.S. PATENT DOCUMENTS 10,959,246 B1 * 3/2021 Manchanda .......... H04W 24/10
2016/0255670 A1 9/2016 Lee et al.
(Continued)

FOREIGN PATENT DOCUMENTS

KR 20150128387 A 11/2015

OTHER PUBLICATIONS

PCT/IB2021/052455, "Notification of Transmittal of the International Search Report and the Written Opinion of the International Searching authority, or the Declaration", International Searching Authority, Jun. 18, 2021, pp. 1-16.
(Continued)

*Primary Examiner* — Won Tae C Kim
(74) *Attorney, Agent, or Firm* — Kunzler Bean & Adamson

(57) ABSTRACT

Apparatuses, methods, and systems are disclosed for determining which transmission to prioritize between overlapping SL and UL transmissions. One apparatus includes a processor and a transceiver operable on an uplink channel and on a sidelink channel. The processor identifies a sidelink transmission and an uplink transmission planned for an overlapping time and determines a transmission type of the sidelink transmission and of the overlapping uplink transmission. The processor prioritizes the uplink transmission over the sidelink transmission in response to the transmission type of the uplink transmission being a random-access procedure message for a primary cell. The processor priori-
(Continued)

tizes the sidelink transmission over the uplink transmission in response to the transmission type of the uplink transmission being a reference signal transmission.

16 Claims, 10 Drawing Sheets

(56) References Cited

U.S. PATENT DOCUMENTS

| | | | |
|---|---|---|---|
| 2018/0262302 A1* | 9/2018 | Bergström | H04L 1/1896 |
| 2020/0053801 A1 | 2/2020 | Hosseini et al. | |
| 2020/0196255 A1* | 6/2020 | Cheng | H04W 72/56 |
| 2021/0029723 A1* | 1/2021 | Wu | H04W 72/569 |
| 2022/0174682 A1* | 6/2022 | Li | H04W 72/1263 |

OTHER PUBLICATIONS

RAN1 "Reply LS on UL-SL prioritization", 3GPP TSG-RAN WG1 Meeting #98bis R1-1911720, Oct. 14-20, 2019, pp. 1-3.
Mediatek Inc. "Discussion on sidelink physical layer structure", 3GPP TSG-RAN WG1 #100 R1-2000445, Feb. 24-Mar. 6, 2020, pp. 1-11.
Vice-Chairwoman (Interdigital), "Report of the LTE break-out session (ProSe, eDRX, V2X, Latred)", 3GPP TSG-RAN WG2 Meeting #92 R2-157012, Nov. 16-20, 2015, pp. 1-37.
Ericsson, "Coexistence Between Sidelink and Uplink Transmission", 3GPP TSG-RAN WG2 #97 Tdoc R2-1700948, Feb. 13-17, 2017, pp. 1-4.
Mediatek Inc. "Prioritization of UL and SL transmission", 3GPP TSG-RAN WG2 Meeting #105bis R2-1903722, pp. 1-3.
Oppo, "Left issues on MAC for NR-V2X", 3GPP TSG-RAN WG2 Meeting #106 R2-1905568, May 13-May 17, 2019, pp. 1-6.
Catt, "Remaining Issues for Prioritization", 3GPP TSG-RAN WG2 Meeting #108 R2-1914448, Nov. 18-22, 2019, pp. 1-5.
3GPP, "3rd Generation Partnership Project; Technical Specification Group Radio Access Network; NR; User Equipment (UE) radio transmission and reception; Part 1: Range 1 Standalone (Release 16)", 3GPP TS 38.101-1 V16.2.0, Dec. 2019, pp. 1-310.
3GPP, "3rd Generation Partnership Project; Technical Specification Group Radio Access Network; NR; User Equipment (UE) radio transmission and reception; Part 2: Range 2 Standalone (Release 16)", 3GPP TS 38.101-2 V16.2.0, Dec. 2019, pp. 1-157.
3GPP, 3rd Generation Partnership Project; Technical Specification Group Radio Access Network; NR; Physical layer procedures for control (Release 15), 3GPP TS 38.213 V15.7.0, Nov. 2019.
3GPP, 3rd Generation Partnership Project; Technical Specification Group Radio Access Network; NR; Physical layer procedures for data (Release 16), 3GPP TS 38.214 V16.0.0, Dec. 2019, p. 1-147.

\* cited by examiner

Table 400: Comparing SL vs UL transmission without association to corresponding data channel priority

|  |  | Uplink | | |
|---|---|---|---|---|
|  |  | SR | SRS | RACH | PUCCH |
| Sidelink | SL CSI (MAC CE) | SL CSI is prioritized compared to UL SR SR transmission is prioritized when it is triggered by SL MAC CE for SL CSI report transmission | SL CSI MAC CE is prioritized compared to UL SRS | RACH for Pcell is prioritized compared to SL RACH for Scell is not prioritized compared to SL | SL CSI MAC CE is prioritized compared to PUCCH format carrying SL HARQ PUCCH format carrying UL HARQ(UL HARQ+ UL CSI) is prioritized compared to SL CSI MAC CE SL CSI MAC CE is prioritized compared to PUCCH format carrying CSI report |
| | PSFCH | PSFCH is prioritized compared to UL SR | PSFCH is prioritized compared to UL SRS | RACH for Pcell is prioritized compared to SL RACH for Scell is not prioritized compared to SL | PSFCH is prioritized compared to PUCCH format carrying CSI report Control channel (applies to both PSFCH/ PUCCH) carrying multiple HARQ feedback (bundling) is prioritized compared to control channel carrying single HARQ feedback Control channel carrying NACK in HARQ feedback report is dropped compared to ACK |

FIG. 4

PUCCH* = PUCCH UL HARQ (ACK/NACK), PUCCH SL HARQ (ACK/NACK), PUCCH CSI, or aperiodic PUCCH PUSCH* = MAC CE, PUSCH UL HARQ (ACK/NACK), PUSCH SL HARQ (ACK/NACK) or PUSCH CSI Table 500: Comparing SL vs UL transmission with association to corresponding data channel priority

| | | Uplink | |
|---|---|---|---|
| | | PUCCH* | PUSCH* |
| Sidelink | SR | Compare the priority of SL MAC CE carried in PSSCH to that of logical channel that triggered UL SR | |
| | SL CSI (MAC CE) | Option 1: Compare the priority of SL MAC CE carried in the SL TB to that of PUCCH. <br><br> - For the case of SL CSI report vs PUCCH carrying SL HARQ feedback, the priority of SL CSI MAC CE is compared to that of SL TB that is transmitting the SL HARQ feedback in PUCCH. <br><br> - For the case of SL CSI report vs PUCCH carrying UL HARQ feedback, the PUCCH carrying UL HARQ feedback is prioritized. <br><br> - For the case of SL CSI report vs PUCCH carrying a CSI report, if the latency for the SL CSI report is lower than a configured threshold, then the SL CSI is prioritized compared to the UL CSI. <br><br> Option 2: PUCCH transmission is prioritized compared to PSSCH carrying SL CSI MAC CE. | Option 1: Compare the priority of SL MAC CE carried in the SL TB to that of PUSCH+UCI and PUSCH carrying MAC CE. <br><br> - For the case of SL CSI report vs PUSCH carrying SL HARQ feedback, the priority of SL CSI MAC CE is compared to that of SL TB that is transmitting the SL HARQ feedback in PUSCH. <br><br> - For the case of SL CSI report vs PUSCH carrying UL HARQ feedback, the PUSCH carrying UL HARQ feedback is prioritized. <br><br> - For the case of SL CSI report vs PUSCH carrying a CSI report, if the latency for the SL CSI report is lower than a configured threshold, then the SL CSI is prioritized compared to the UL CSI. <br><br> - For the case of SL CSI report vs PUSCH carrying MAC CE, assign priority to each MAC CE and compare the relative priorities of MAC CEs. Drop a UL BSR compared to SL CSI. <br><br> Option 2: Compare the priority of PSSCH (carrying SL CSI MAC CE) to that of PUSCH+UCI and PUSCH carrying MAC CE. PUSCH carrying SL HARQ, UL HARQ, and UL CSI are prioritized compared to PSSCH carrying SL CSI MAC CE. |

FIG. 5A

PUCCH* = PUCCH UL HARQ (ACK/NACK), PUCCH SL HARQ (ACK/NACK), PUCCH CSI, or aperiodic PUCCH PUSCH* = MAC CE, PUSCH UL HARQ (ACK/NACK), PUSCH CSI, or PUSCH SL HARQ (ACK/NACK)

Table 500 (Cont.): Comparing SL vs UL transmission with association to corresponding data channel priority

| Sidelink | | Uplink | |
|---|---|---|---|
| | SR | PUCCH* | PUSCH* |
| PSFCH (no SL data) | Compare the priority of corresponding SL TB that is transmitting the SL HARQ to that of logical channel priority that triggered SR | Compare priority of corresponding SL TB carrying SL HARQ feedback in PSFCH with that of corresponding UL TB carrying UL HARQ feedback in PUCCH (or SL TB carrying SL HARQ feedback in PUCCH). PSFCH is prioritized compared to PUCCH format carrying CSI reports. Control channel carrying NACK is HARQ feedback report is dropped compared to ACK. | PUSCH carrying UL CSI is deprioritized compared to PSFCH. Compare priority of the corresponding SL TB for PSFCH to that of UL TB that generated SL HARQ / UL HARQ carried in PUSCH. Control channel (applies to both PSFCH/ PUSCH) carrying multiple HARQ feedback (bundling) is prioritized compared to control channel carrying single HARQ feedback |
| PSFCH + SL data | Compare the highest priority of corresponding SL TB that is transmitting the SL HARQ and SL data to that of logical channel priority that triggered SR | Compare highest priority of corresponding SL TB carrying SL HARQ feedback in PSFCH and PSSCH with that of corresponding UL TB carrying UL HARQ feedback in PUCCH (or SL TB carrying SL HARQ feedback in PUCCH). PSFCH is prioritized compared to PUCCH format carrying CSI reports. | PUSCH carrying UL CSI is deprioritized compared to PSFCH+SL data. Compare priority of the corresponding SL TB for PSFCH to that of UL TB that generated SL HARQ / UL HARQ carried in PUSCH. |

FIG. 5B

Table 600: Comparing SL data vs UL control channel/reference signal

| | | Uplink | | |
|---|---|---|---|---|
| | | RACH | SRS | PUCCH* | PUSCH* |
| Sidelink | SL Data / PSSCH | Option 1: RACH on PCell is prioritized, but RACH on SCell is not prioritized compared with SL data<br><br>Option 2: Compare SL data against a configured threshold and SL data is prioritized when it is higher that the configured SL threshold and the corresponding logical channel is configured for V2X NR Mode 2 | Compare SL data against a configured SL threshold. SL data is prioritized when it is higher than the configured threshold. | Compare priority of SL data with that of corresponding priority of UL TB for UL HARQ or SL TB for SL HARQ feedbacks.<br><br>Compare SL data against a configured threshold and higher priority SL data is prioritized compared to UL CSI<br><br>Compare LS data against a configured threshold and SL data is prioritized compared to Control channel carrying NACK in HARQ feedback report | PUSCH carrying UL HARQ feedback is prioritized compared to SL data<br><br>Compare SL data priority to that of corresponding SL TB priority for SL HARQ feedback carried by PUSCH<br><br>Compare SL data against a configured threshold and for higher priority SL data is prioritized for UL CSI |

FIG. 6

PRIORITIZATION OF OVERLAPPING SL AND UL TRANSMISSIONS

CROSS-REFERENCE TO RELATED APPLICATIONS

This application claims priority to U.S. Provisional Patent Application Ser. No. 62/994,151 entitled "UPLINK AND SIDELINK PRIORITIZATION IN 5G-NR" and filed on Mar. 24, 2020 for Karthikeyan Ganesan, Prateek Basu Mallick, Joachim Loehr, Alexander Johann Maria Golitschek Edler von Elbwart, and Ravi Kuchibhotla, which application is incorporated herein by reference.

FIELD

The subject matter disclosed herein relates generally to wireless communications and more particularly relates to determining which transmission to prioritize between overlapping sidelink ("SL") and uplink ("UL") transmissions.

BACKGROUND

In certain wireless communication systems, sidelink ("SL") communication is supported for device-to-device communication among User Equipments ("UEs"). In various embodiments, a UE communicating over sidelink may also be in communication with a Radio Access Network ("RAN"). As such, the UE may have a SL transmission and an UL transmission that overlap in the time domain. Accordingly, the UE may need to determine which transmission to prioritize between overlapping SL and UL transmissions.

BRIEF SUMMARY

Disclosed are procedures for determining which transmission to prioritize between overlapping SL and UL transmissions. Said procedures may be implemented by apparatus, systems, methods, or computer program products.

One method of a UE includes identifying a SL transmission and an UL transmission planned for an overlapping time and determining a transmission type of the SL transmission and of the overlapping UL transmission. The method includes prioritizing the UL transmission over the SL transmission in response to the transmission type of the UL transmission being a random-access procedure (i.e., RACH procedure) message for a primary cell ("PCell"). Here, prioritizing the UL transmission includes dropping the SL transmission or reducing a transmission power of the SL transmission during the overlap. The method also includes prioritizing the SL transmission over the UL transmission in response to the transmission type of the UL transmission being a reference signal ("RS") transmission. Here, prioritizing the SL transmission includes dropping the RS transmission or reducing a transmission power of the RS transmission during the overlap.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a diagram illustrating one embodiment of a table for determining prioritization of SL versus UL transmission without association to corresponding data channel priority;

FIG. 5A is a diagram illustrating one embodiment of a table for determining prioritization of SL versus UL transmission with association to corresponding data channel priority;

FIG. 5B is a continuation of the table of FIG. 5A;

FIG. 6 is a diagram illustrating one embodiment of a table for determining prioritization of SL data transmission versus UL control channel or reference signal transmission;

DETAILED DESCRIPTION

Figure 1:
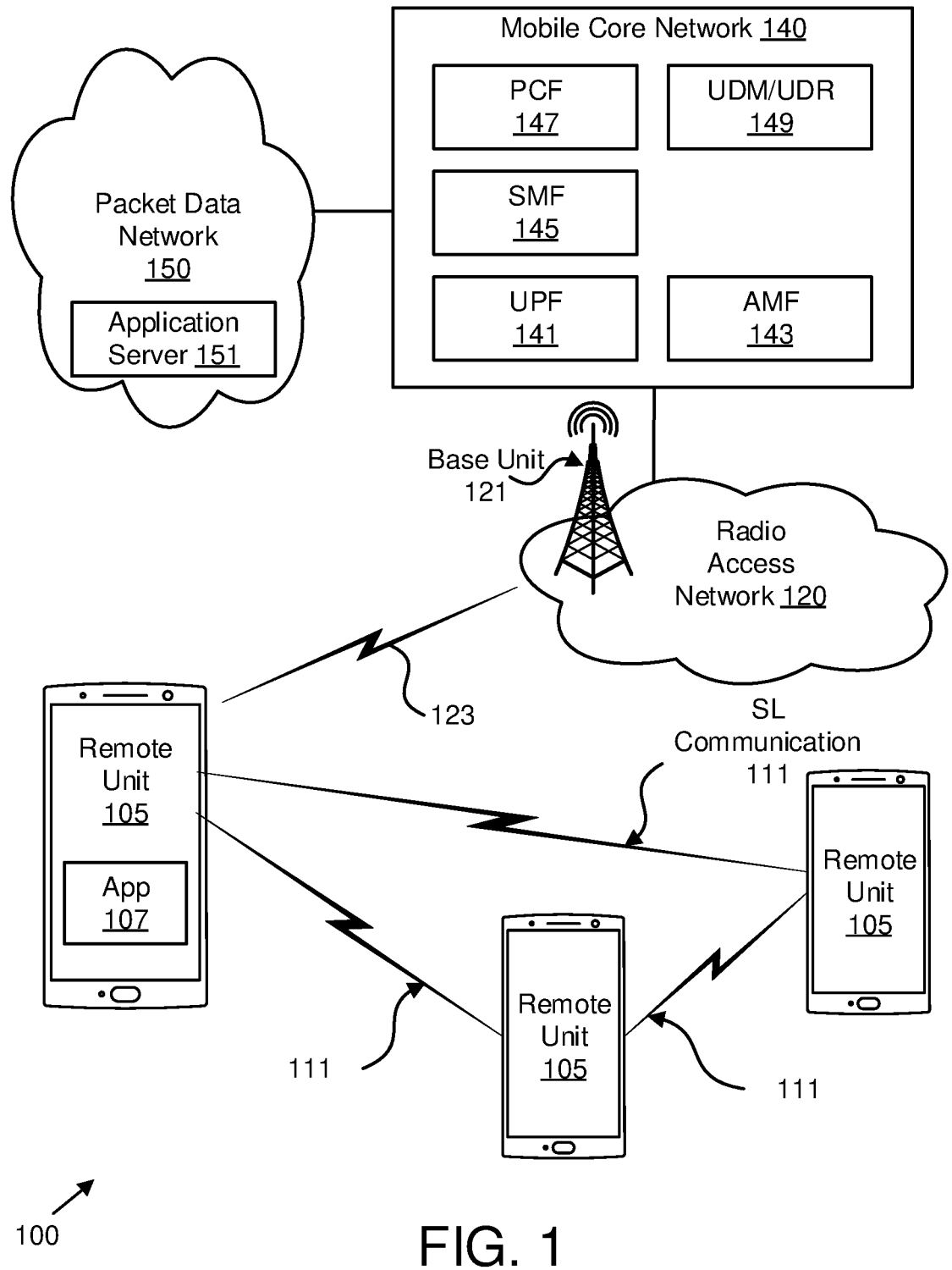
FIG. 1 is a schematic block diagram illustrating one embodiment of a wireless communication system for determining which transmission to prioritize between overlapping SL and UL transmissions.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for determining which transmission to prioritize between overlapping sidelink ("SL") and uplink ("UL") transmissions, also referred to as "contention resolution" between the overlapping SL and UL transmissions. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

The disclosed solutions include a prioritization procedure for the overlapping UL transmission and SL transmission in a time slot. UL physical channel being but not limited to a random-access procedure (i.e., RACH procedure) message for a primary cell ("PCell"), Random Access Channel ("RACH") message for a secondary cells, Physical Uplink Control Channel ("PUCCH"), Physical Uplink Shared Channel ("PUSCH"), Sounding Reference Signal ("SRS"), and Scheduling Request ("SR"). Here, prioritizing the UL transmission includes dropping the SL transmission or reducing a transmission power of the SL transmission during the overlap. The method also includes prioritization procedure for the overlapping SL transmission and UL transmission in a time slot. SL physical channel being but not limited to Physical Sidelink Control Channel ("PSCCH"), Physical Sidelink Shared Channel ("PSSCH"), and Physical Sidelink Feedback Channel ("PSFCH"). Here, prioritizing the SL transmission includes dropping the reference signal ("RS") transmission or reducing a transmission power of the RS transmission during the overlap.

In various embodiments, if a User Equipment ("UE") is scheduled to simultaneously transmit on the UL and on the SL of a serving cell, but is not capable of capable of simultaneous transmissions on the UL and on the SL of the serving cell, then the UE transmits only on the link—i.e., UL or SL—with the higher priority. Additionally, if a UE is scheduled to transmit on the UL and on the SL of two respective carriers of a serving cell, or of two respective serving cells and capable of simultaneous transmissions on the UL and on the SL of the serving cell, where on the UL and on the SL of two respective carriers of a serving cell, or of two respective serving cells and the total UE transmission power over the time period would exceed $P_{CMAX}$ (i.e., the configured maximum power), then the UE determines whether the SL transmission has higher priority than the UL transmission. If the SL transmission has higher priority than the UL transmission, then the UE reduces the power for the UL transmission prior to the start of the UL transmission so that the total UE transmission power would not exceed $P_{CMAX}$. Otherwise, if the UL transmission has higher priority than the SL transmission, then the UE reduces the power for the SL transmission prior to the start of the SL transmission so that the total UE transmission power would not exceed $P_{CMAX}$.

Regarding UL Physical channel prioritizations for transmission power reductions, For single cell operation with two uplink carriers or for operation with carrier aggregation, if a total UE transmit power for Physical Uplink Shared Channel ("PUSCH") transmissions or Physical Uplink Control Channel ("PUCCH") transmissions or Physical Random Access Channel ("PRACH") transmissions or Sounding Reference Signal ("SRS") transmissions on serving cells in a frequency range in a respective transmission occasion i would exceed $\hat{P}_{CMAX}(i)$, where $\hat{P}_{CMAX}(i)$ is the linear value of $P_{CMAX}(i)$ in transmission occasion i (e.g., as defined in Third Generation Partnership Project ("3GPP") Technical Specification ("TS") 38.101-1 for Frequency Range #1 Between ("FR1", i.e., frequencies from 410 MHz to 7125 MHz) and in 3GPP TS38.101-2 for Frequency Range #2 ("FR2", i.e., frequencies from 24.25 GHz to 52.6 GHZ)). The UE allocates power to PUSCH/PUCCH/PRACH/SRS transmissions according to the following priority order (in descending order) so that the total UE transmit power for transmissions on serving cells in the frequency range is smaller than or equal to $\hat{P}_{CMAX}(i)$ for that frequency range in every symbol of transmission occasion i. When determining a total transmit power for serving cells in a frequency range in a symbol of transmission occasion i, the UE does not include power for transmissions starting after the symbol of transmission occasion i. The total UE transmit power in a symbol of a slot is defined as the sum of the linear values of UE transmit powers for PUSCH, PUCCH, PRACH, and SRS in the symbol of the slot.

PRACH transmission on the Primary Cell ("PCell")

PUCCH transmission with HARQ-ACK information, and/or SR, and/or Location Report Request ("LRR"), or PUSCH transmission with HARQ-ACK information PUCCH transmission with Channel State Information ("CSI") or PUSCH transmission with CSI PUSCH transmission without HARQ-ACK information or CSI and, for Type-2 random access procedure (i.e., RACH procedure) PUSCH transmission on the PCell SRS transmission, with aperiodic SRS having higher priority than semi-persistent and/or periodic SRS, or PRACH transmission on a serving cell other than the PCell In case of same priority order and for operation with carrier aggregation, the UE prioritizes power allocation for transmissions on the primary cell of the Master Cell Group ("MCG") or the Secondary Cell Group ("SCG") over transmissions on a secondary cell. In case of same priority order and for operation with two UL carriers, the UE prioritizes power allocation for transmissions on the carrier where the UE is configured to transmit PUCCH. If PUCCH is not configured for any of the two UL carriers, the UE prioritizes power allocation for transmissions on the non-supplementary UL carrier.

Note that separate Logical Channel ("LCH") priority thresholds may be configured for both New Radio Uplink ("NR-UL") and New Radio Sidelink ("NR-SL"). For between SL-data and UL-data/SRB, the SL transmission is prioritized if the highest priority value of UL LCH(s) with available data is larger than the UL priority threshold and the highest priority value of SL LCH(s) with available data is lower than the SL priority threshold (note that lower priority values indicate higher priority). Otherwise, the UL transmission is prioritized. Prioritization between UL Scheduling Request ("SR") and SL data transmission may be based on priority of the UL LCH that triggered the UL SR and priority value(s) of SL LCH(s), similar as prioritization between NR UL data and NR SL data transmission.

For prioritization between SL transmission and SL-triggered SR, it is based on direct comparison between associated LCH priority. For prioritization between SL transmission and UL transmission (only for PUSCH), for UL MAC CE, these are treated as if of priority lower than the UL-threshold, and so deprioritized if the SL transmission is higher than the SL-threshold, but prioritized if the SL transmission is not higher than the SL-threshold. For LTE-UL/NR-SL and NR-UL/LTE-SL, if the two Radio Access Technologies ("RATs") cannot exchange prioritization-related information prior to time of transmission subject to processing time restriction, it is up to UE implementation to decide whether UL or SL to prioritize. If the two RATs can exchange prioritization-related information prior to time of transmission subject to processing time restriction, rely on LTE solution for LTE-UL/NR-SL and NR-UL/LTE-SL prioritization.

However, uplink vs sidelink ("UL/SL") prioritization of following physical channels is not defined: PUCCH with Uu Uplink Control Information ("UCI"), PUCCH with SL HARQ reporting, PUSCH with SL HARQ reporting and with Uplink Shared Channel ("UL-SCH," i.e., a traffic channel), PUSCH with Uu UCI and without UL-SCH, and SRS. In some embodiments, LTE V2X UL/SL prioritization may be reused for NR V2X UL/SL prioritization, for one or more of the above channels.

For example, the prioritization between SL transmission and SL-triggered SR may be used for the case of PUCCH with SL HARQ reporting. The priority of SL HARQ reporting on PUCCH is the same as the priority of a corresponding PSFCH and is compared with the priority of SL transmission for the prioritization. As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a Transport Block ("TB") is erroneously received and DTX means that no TB was detected.

FIG. 1 depicts a wireless communication system 100 for determining which transmission to prioritize between overlapping SL and UL transmissions, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the 3GPP specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. Additionally, one remote unit 105 may communicate directly with another remote unit 105 (i.e., without relaying via a base unit 121) using sidelink ("SL") communication signals 111. In certain embodiments, the SL communication employs a PC5 interface In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QOS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. Each mobile core network 140 belongs to a single PLMN. The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, and a Unified Data Management function ("UDM"). In some embodiments, the UDM is co-located with a User Data Repository ("UDR"), depicted as combined entity "UDM/UDR" 149. In various embodiments, the mobile core network 140 may also include an Authentication Server Function ("AUSF"), a Network Repository Function ("NRF") (used by the various NFs to discover and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In various embodiments, the remote units 105 may communicate directly with each other (e.g., device-to-device communication) using SL communication signals 125. In one embodiment, the SL communication signals support V2X (vehicle-to-everything) communications. A remote unit 105 may be provided with different V2X communication resources for different V2X modes. Mode-1 corresponds to a NR-based network-scheduled V2X communication mode. Mode-2 corresponds to a NR-based UE-scheduled V2X communication mode. Mode-3 corresponds to an LTE-based network-scheduled V2X communication mode. Mode-4 corresponds to an LTE-based UE-scheduled V2X communication mode.

In some embodiments, a remote unit 105 prioritizes the SL control channel transmission such as PSFCH, SL CSI report in SL MAC CE, SL MAC CE etc., over UL SRS, UL SR, CSI transmission. In such embodiments, SR transmission is prioritized when it is triggered by SL MAC CE for SL CSI report transmission.

In some embodiments, a remote unit 105 prioritizes the SL CSI MAC CE transmission compared to PUCCH format carrying SL HARQ and CSI report, whereas remote unit 105 prioritizes UL HARQ in other cases.

In some embodiments, a remote unit 105 prioritizes Control channel (applies to both PSFCH/PUCCH) carrying multiple HARQ feedback (bundling of HARQ feedback from multiple TBs) is prioritized compared to control channel carrying single HARQ feedback. In such embodiments, the remote unit 105 prioritizes Control channel (applies to both PSFCH/PUCCH) carrying NACK in HARQ feedback report is dropped compared to ACK.

In some embodiments, a remote unit 105 compares the priority of corresponding SL TB of PSFCH to that of logical channel priority that triggered SR, UL TB that generated SL HARQ/UL HARQ carried in PUSCH and PUCCH.

In some embodiments, a remote unit 105 compares the MAC CE of SL CSI priority to that of logical channel priority that triggered SR and SL TB that is transmitting the SL HARQ feedback in PUSCH/PUCCH. In such embodiments, each MAC CE could be assigned a certain priority and the relative priority of each MAC CE is compared to prioritize transmission between SL and UL. In certain embodiments, the remote unit 105 compares the priority of PSSCH (carrying SL CSI MAC CE) to that of PUSCH+UCI and PUSCH carrying MAC CE and PUSCH carrying SL HARQ, UL HARQ and UL CSI are prioritized compared to that of PSSCH.

In some embodiments, a remote unit 105 compares the SL data priority with that of corresponding UL or SL TB priority against UL HARQ/SL HARQ transmission over PUCCH, PUSCH. In such embodiments, SL data priority is compared against a configured SL threshold and for higher priority SL data is prioritized compared to UL HARQ/SL HARQ transmission over PUCCH, PUSCH. In such embodiments, the remote unit 105 compares SL data priority against a configured SL threshold and for higher priority SL data is prioritized compared to UL CSI, second cell RACH, SRS. In certain embodiments, the remote unit 105 compares SL data against a configured threshold (i.e., in parameter sl-PriorityThreshold-UL-URLLC) and for higher priority SL data is prioritized compared to Control channel (i.e., PSFCH) carrying NACK in HARQ feedback report (Groupcast option-1).

While FIG. 1 depicts components of a 5G RAN and a 5G core network, the described embodiments for determining which transmission to prioritize between overlapping SL and UL transmissions apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting measurement reporting in non-public networks.

Figure 2A:
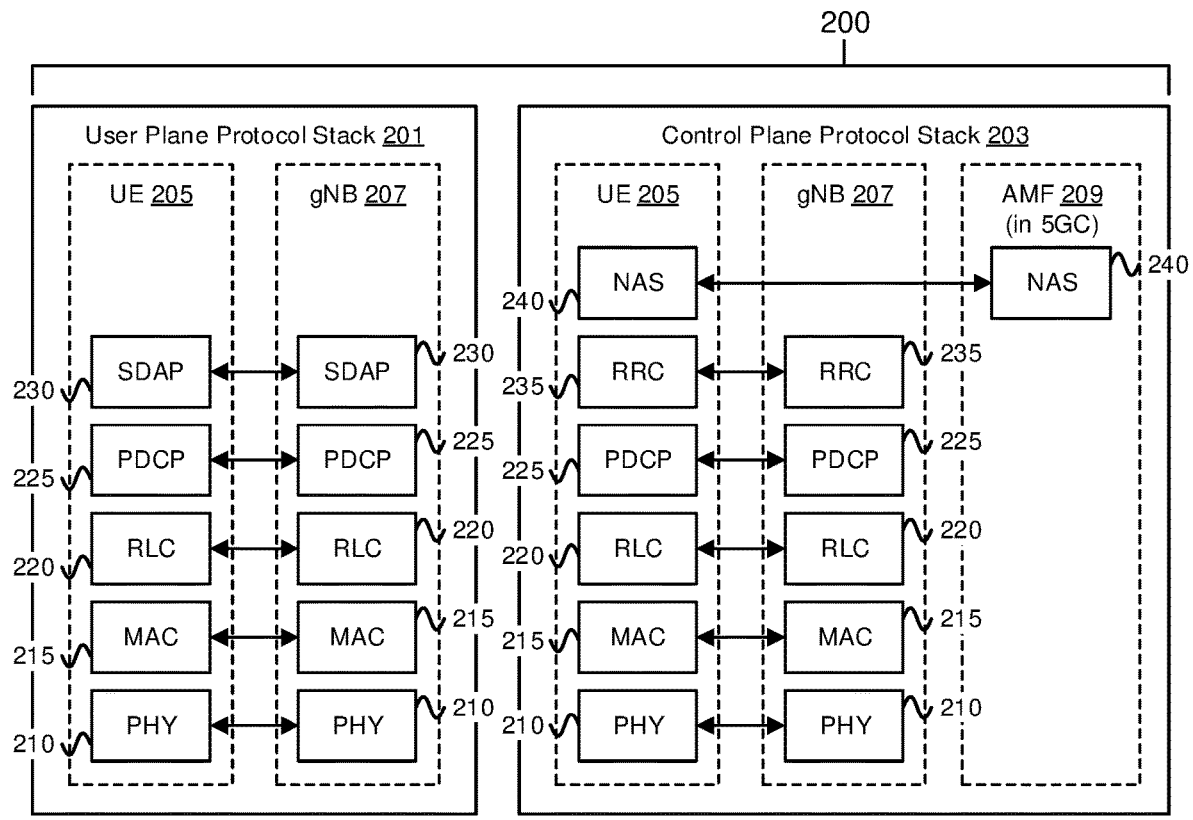
FIG. 2A is a diagram illustrating one embodiment of a NR protocol stack.

FIG. 2A depicts a NR protocol stack 200, according to embodiments of the disclosure. While FIG. 2A shows the UE 205, the RAN node 207 and an AMF 209 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 210, a Medium Access Control ("MAC") sublayer 215, the Radio Link Control ("RLC") sublayer 220, a Packet Data Convergence Protocol ("PDCP") sublayer 225, and Service Data Adaptation Protocol ("SDAP") layer 230. The Control Plane protocol stack 203 includes a physical layer 210, a MAC sublayer 215, a RLC sublayer 220, and a PDCP sublayer 225. The Control Plane protocol stack 203 also includes a Radio Resource Control ("RRC") layer 235 and a Non-Access Stratum ("NAS") layer 240.

The AS protocol stack for the Control Plane protocol stack 203 consists of at least RRC, PDCP, RLC and MAC sublayers, and the physical layer. The AS protocol stack for the User Plane protocol stack 201 consists of at least SDAP, PDCP, RLC and MAC sublayers, and the physical layer. The Layer-2 ("L2") is split into the SDAP, PDCP, RLC and MAC sublayers. The Layer-3 ("L3") includes the RRC sublayer 220 and the NAS layer 225 for the control plane and includes, e.g., an Internet Protocol ("IP") layer or PDU Layer (note depicted) for the user plane. L1 and L2 are referred to as "lower layers" such as PUCCH/PUSCH or MAC Control Element ("CE"), while L3 and above (e.g., IP layer, transport layer (e.g., TCP, UDP, DCCP, SCTP), application layer (e.g., HTTP, SIP, SMTP, POP, etc.)) are referred to as "higher layers" or "upper layers. As an example, "upper layer signaling" may refer to signaling exchange at the RRC layer 230.

The physical layer 210 offers transport channels to the MAC sublayer 215. The MAC sublayer 215 offers logical channels to the RLC sublayer 220. The RLC sublayer 220 offers RLC channels to the PDCP sublayer 225. The PDCP sublayer 225 offers radio bearers to the SDAP sublayer 230 and/or RRC layer 235. The SDAP sublayer 230 offers QoS flows to the 5GC. The RRC layer 235 provides for the addition, modification, and release of Carrier Aggregation and/or Dual Connectivity. The RRC layer 235 also manages the establishment, configuration, maintenance, and release of Signaling Radio Bearers ("SRBs") and Data Radio Bearers ("DRBs"). In certain embodiments, a RRC entity functions for detection of and recovery from radio link failure.

The NAS layer 240 is between the UE 205 and the AMF 209 in the 5GC. NAS messages are passed transparently through the RAN. The NAS layer 240 is used to manage the establishment of communication sessions and for maintaining continuous communications with the UE 205 as it moves between different cells of the RAN. In contrast, the AS layer is between the UE 205 and the RAN carries information over the wireless portion of the network. While not depicted in FIG. 2A, the IP layer exists above the NAS layer 240, a transport layer exists above the IP layer, and an application layer exists above the transport layer.

Figure 2B:
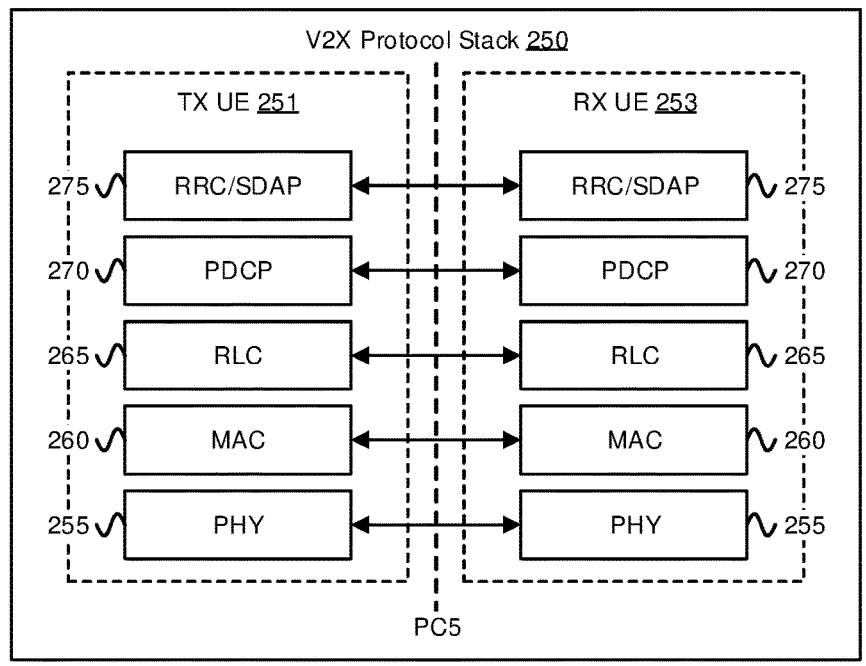
FIG. 2B is a diagram illustrating one embodiment of a PC5 protocol stack.

FIG. 2B depicts a PC5 protocol stack 250, according to embodiments of the disclosure. While FIG. 2B shows the transmitter ("Tx") UE 251 and the receiver ("Rx") UE 253, these are representative of a set of UEs communicating peer-to-peer via PC5 and other embodiments may involve different UEs. As depicted, the PC5 protocol stack includes a physical layer 255, a MAC sublayer 260, a RLC sublayer 265, a PDCP sublayer 270, and RRC and SDAP layers (depicted as combined element "RRC/SDAP" 275), for the control plane and user plane, respectively.

The AS protocol stack for the control plane in the PC5 interface consists of at least RRC, PDCP, RLC and MAC sublayers, and the physical layer. The AS protocol stack for the user plane in the PC5 interface consists of at least SDAP, PDCP, RLC and MAC sublayers, and the physical layer. The L2 is split into the SDAP, PDCP, RLC and MAC sublayers. The L3 includes the RRC sublayer for the control plane and includes, e.g., an IP layer for the user plane. As with the NR protocol stack, in the Pc5 protocol stack L1 and L2 are referred to as "lower layers", while L3 and above (e.g., transport layer, V2X layer, application layer) are referred to as "higher layers" or "upper layers."

Figure 3:
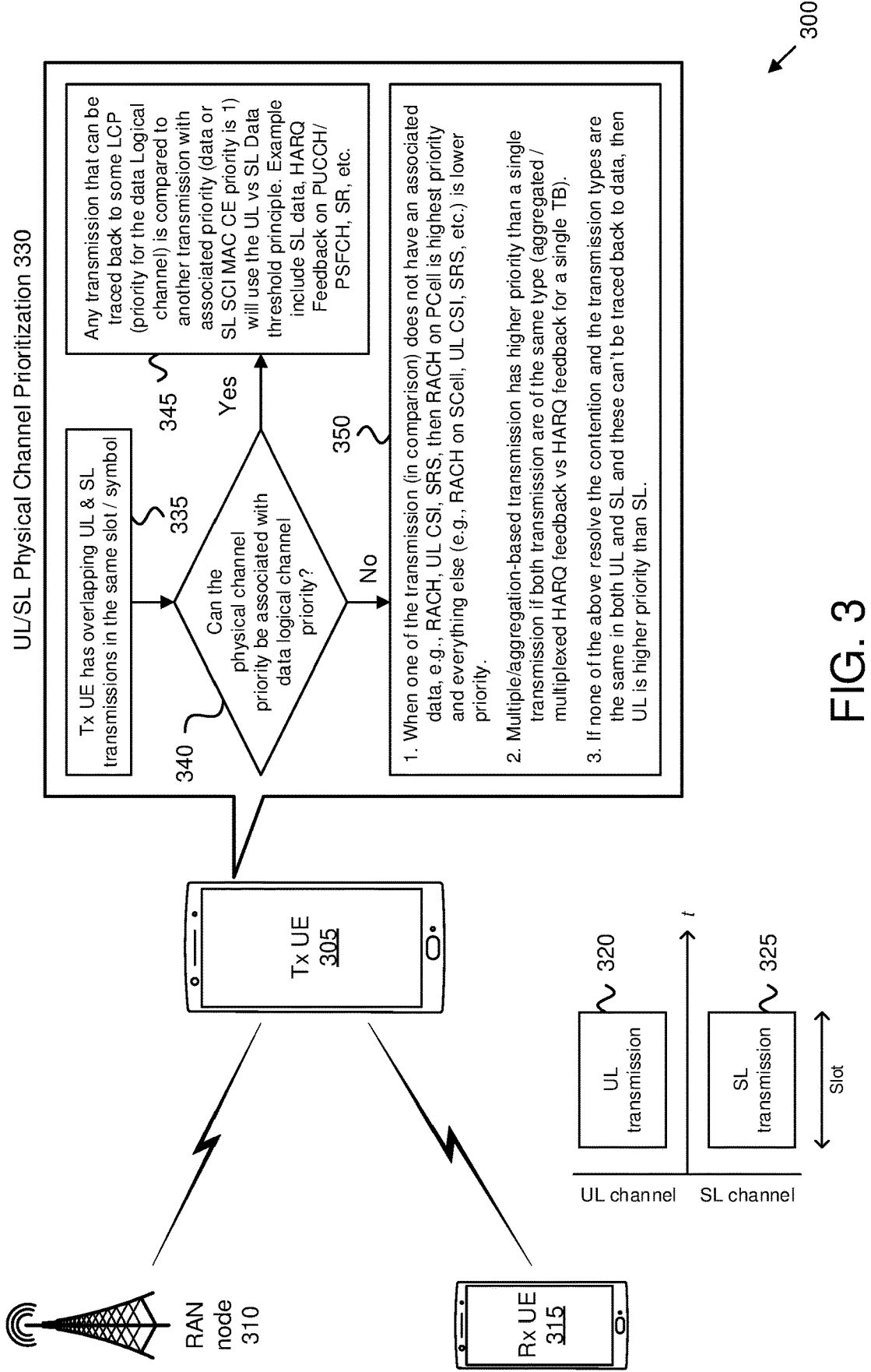
FIG. 3 is a diagram illustrating one embodiment of a Tx UE performing uplink versus sidelink ("UL/SL") physical channel prioritization.

FIG. 3 depicts an example scenario 300 where a transmitter UE ("Tx UE") 305 has an uplink ("UL") transmission 320 and a sidelink ("SL") transmission 325 scheduled for the same time slot (or symbol). As used herein, "time slot" refers to a unit in the time domain where a UE may be scheduled UL frequency resources for one or more time slots. The Tx UE 305 is in communication with a RAN node 310 and may be granted resources for the UL transmission 320. Additionally, the Tx UE is in communication with at least one receiver UE ("Rx UE") 315 and has a SL transmission 325 that overlaps (in the time domain) with the UL transmission 320. Accordingly, the Tx UE 205 performs UL/SL physical channel prioritization to determine which transmission to prioritize (i.e., between the UL transmission 320 and the SL transmission 325).

FIG. 3 depicts an exemplary UL/SL Physical Channel Prioritization procedure 330 used to determine which transmission to prioritize. In some embodiments, the UL/SL Physical Channel Prioritization procedure 330 may be supplemented with the prioritization rules discussed below with reference to FIGS. 4-6.

The UL/SL Physical Channel Prioritization procedure 330 begins with the Tx UE 305 determining that it has overlapping UL transmission 320 and SL transmission 325 in the same slot or symbol (see step 335). Next, the Tx UE 305 determines whether the physical channel priority can be associated with a data logical channel priority (see decision step 340).

In response to determining that the physical channel priority can be associated with a data logical channel priority, the Tx UE 305 applies rules for transmission priority with association to a corresponding data channel priority. As an exemplary rule, the Tx UE 305 may compare any transmission that can be traced back to some Logical Channel Prioritization ("LCP") procedure (i.e., identifying a priority for the data Logical channel) to another transmission with associated priority (data or SL Sidelink Control Information ("SCI") MAC Control Element ("CE") priority is 1) will use the UL vs SL Data threshold principle described below in further detail with reference to FIGS. 5A-5B. Examples of transmissions that can be associated with a logical channel priority include SL data, Hybrid Automatic Repeat Request ("HARQ") Feedback on Physical Uplink Control Channel ("PUCCH"), HARQ Feedback on Physical Sidelink Feedback Channel ("PSFCH"), Scheduling Request ("SR"), etc.

However, if the Tx UE 305 determines that the physical channel priority cannot be associated with a data logical channel priority, then the Tx UE 305 applies rules for transmission priority without association to a corresponding data channel priority. As a first exemplary rule, the Tx UE 305 may assign highest priority to RACH on Primary Cell ("PCell") with everything else (e.g., RACH on Secondary Cell ("SCell"), UL CSI, SRS, etc.) being a lower priority. As used herein, PCell refers to the cell in which a UE either performs an initial RRC connection establishment procedure or initiates RRC connection re-establishment procedure, or the cell indicated as the primary cell in the handover procedure. As used herein, SCell refers to a cell, e.g., operating on a secondary frequency, which may be configured once an RRC connection is established and which may be used to provide additional radio resources.

As a second exemplary rule, the Tx UE 305 may assign higher priority to a multiplexed/aggregation-based transmission than to a single transmission of the same type (i.e., aggregated HARQ feedback (of multiple transport blocks ("TB")) is prioritized over HARQ feedback of a single TB). As a third exemplary rule, if neither of the above rules resolve the priority contention and the transmissions are the same transmission type in both UL and SL (and the transmissions cannot be traced back to data), then the UL transmission 320 is assigned a higher priority than the SL transmission 325.

FIG. 4 depicts a table 400 showing a comparison of SL transmission priority versus UL transmission priority without association to a corresponding data channel priority. The rows of the Table 400 represent different types of sidelink control channel transmissions (i.e., SL CSI report in SL MAC CE and PSFCH), while the columns of the Table 400 represent different types of uplink control channel or reference transmissions (i.e., SR, SRS, RACH and PUCCH). FIG. 4 illustrates one example of the first solution for determining which transmission to prioritize between overlapping SL and UL transmissions.

According to the first solution, the Tx UE 305 determines which transmission to prioritize of the overlapping SL or UL transmissions without considering a data channel priority corresponding to the SL transmission or UL transmission. The Tx UE 305 may prioritize the uplink or sidelink transmission according to the table 400 by either dropping the corresponding uplink or sidelink transmission or using power scaling (i.e., reducing the power of the lower priority transmission) in a slot or symbol.

According to embodiments of the first solution, the Tx UE 305 prioritizes a SL control channel transmission (such as PSFCH, SL CSI report in SL MAC CE, SL MAC CE, etc.) over UL SRS transmissions and UL SR transmissions. In one embodiment of the first solution, a SL MAC CE carrying SL CSI is prioritized over a UL SR transmission. However, in another embodiment, the Tx UE 305 prioritizes a UL SR transmission over a SL MAC CE if the UL SR is triggered by SL MAC CE for SL CSI report transmission.

In certain embodiments, the UL SR is deprioritized only when the priority of the logical channel that triggered SR is lower than a certain threshold (i.e., has higher numeric value). However, when the priority of the logical channel that triggered SR is same as that of the priority of SL CSI MAC CE, e.g., both are of the highest priority (i.e., priority value=1), then in one implementation the transmission of SL CSI MAC CE is prioritized and in another implementation UL SR is prioritized. In some embodiments, the Tx UE behavior may be specified as one of these two. In other embodiments, the Tx UE behavior may be configured by the network.

According to embodiments of the first solution, the Tx UE 305 prioritizes the RACH transmitted for the primary cell ("PCell") over a SL control channel transmission. However, in one embodiment the Tx UE 305 may prioritize a SL control channel transmission over a RACH transmission for a secondary cell ("SCell").

According to some embodiments of the first solution, the Tx UE 305 prioritizes the SL CSI MAC CE transmission compared to PUCCH format carrying SL HARQ. In certain embodiments, the Tx UE 305 prioritizes the SL CSI MAC CE transmission compared to PUCCH format carrying UL CSI report. However, in other embodiments, the Tx UE 305 prioritizes PUCCH format carrying both UL HARQ and UL CSI over SL CSI MAC CE. In some embodiments, the Tx UE 305 prioritizes UL CSI over SL CSI if the colliding (i.e., overlapping) transmissions cannot be directly traced back to LCH priorities.

According to embodiments of the first solution, the Tx UE 305 (or a Rx UE) prioritizes PSFCH transmission compared to PUCCH format carrying UL CSI. In some embodiments, the Tx UE 305 (or a Rx UE) prioritizes a control channel carrying multiple HARQ feedback (i.e., bundling of HARQ feedback for multiple TBs) over a control channel carrying single HARQ feedback (applies to both PSFCH and PUCCH). For example, PUCCH bundling multiple HARQ feedback reports would be prioritized over PSFCH carrying single HARQ feedback. In some embodiments, the Tx UE 305 (or a Rx UE) prioritizes a control channel carrying NACK as HARQ feedback over a control channel carrying ACK as HARQ feedback (applies to both PSFCH and PUCCH). For example, PUCCH carrying ACK as HARQ feedback would be deprioritized in favor of PSFCH carrying NACK as HARQ feedback.

FIG. 5A depicts a table 500 showing a comparison of SL transmission priority versus UL transmission priority with association to a corresponding data channel priority. Due to size, the Table 500 is continued at FIG. 5B. The rows of the Table 500 represent different types of sidelink transmissions (i.e., SL CSI report in SL MAC CE, PSFCH without SL data, and PSFCH accompanied by SL data), while the columns of the Table 400 represent different types of uplink control channel transmissions (i.e., SR, PUSCH and PUCCH). FIGS. 5A-5B illustrate one example of the second solution for determining which transmission to prioritize between overlapping SL and UL transmissions.

According to the second solution, the Tx UE 305 considers a data channel priority corresponding to the SL transmission or UL transmission when determining which transmission to prioritize of the overlapping SL or UL transmissions. The Tx UE 305 determines the priority of the control channel based on the priority of the corresponding data. Further, the Tx UE 305 may prioritize the uplink or sidelink transmission according to the table 500 by either dropping the corresponding uplink or sidelink transmission or using power scaling (i.e., reducing the power of the lower priority transmission) in a slot/symbol.

According to embodiments of the second solution, when determining which transmission to prioritize of the overlapping SL or UL transmissions the Tx UE 305 compares the priority of a corresponding SL TB of PSFCH to the priority of the logical channel that triggered SR, or to the priority of a corresponding UL TB that generated SL HARQ/UL HARQ carried in PUSCH and PUCCH.

In certain embodiments, the Tx UE 305 prioritizes the PSFCH transmission compared to UL CSI reports transmitted by PUSCH and PUCCH. In certain embodiments, the Tx UE 305 prioritizes a control channel (applies to PSFCH/ PUSCH+UCI/PUCCH) carrying multiple HARQ feedback (i.e., bundling) is prioritized compared to a control channel carrying single HARQ feedback.

In certain embodiments, when PSSCH (i.e., carrying the SL data) and PSFCH are transmitted and/or received together, the highest priority among them (i.e., lowest priority value) is taken for the priority comparison. In one embodiment, the Tx UE 305 prioritizes a PSFCH transmission over a UL CSI transmitted in PUSCH/PUCCH (i.e., PUSCH CSI or PUCCH CSI).

According to embodiments of the second solution, when determining which transmission to prioritize of the overlapping SL or UL transmissions the Tx UE 305 compares the MAC CE of SL CSI priority to that of logical channel priority that triggered SR and SL TB that is transmitting the SL HARQ feedback in PUSCH/PUCCH. In certain embodiments, the Tx UE 305 assigns a certain priority to each MAC CE and then compares the relative priorities of each MAC CE to prioritize transmission between SL and UL.

In some embodiments, the Tx UE 305 compares the priority of PSSCH (e.g., carrying SL CSI MAC CE) to that of: PUSCH with UCI and PUSCH carrying MAC CE and PUSCH carrying SL HARQ. Moreover, the Tx UE 305 may prioritize UL HARQ and UL CSI as compared to PSSCH carrying SL CSI MAC CE.

FIG. 6 depicts a table 600 showing a comparison of SL data versus UL transmission priority without association to a corresponding data channel priority. The row of the Table 600 represents the SL data (i.e., PSSCH) type of sidelink transmission, while the columns of the Table 600 represent different types of uplink control channel or reference transmissions (i.e., RACH, SRS, PUCCH and PUSCH). FIG. 6 illustrates one example of the third solution for determining which transmission to prioritize between overlapping SL and UL transmissions.

According to the third solution, the Tx UE 305 uses a priority of the SL data transmission when determining which transmission to prioritize of the overlapping SL or UL transmissions. In some embodiments, the Tx UE 305 compares the SL data priority with that of a corresponding UL TB priority for UL HARQ transmission over PUCCH or PUSCH. In some embodiments, the Tx UE 305 compares the SL data priority with that of a corresponding SL TB priority for SL HARQ transmission over PUCCH or PUSCH.

In some embodiments, the Tx UE 305 compares the SL data priority against a configured SL threshold (i.e., sl-PriorityThreshold-UL-URLLC) and—if the SL data priority is higher than the threshold—prioritizes the higher priority SL data over UL CSI (either in PUCCH or PUSCH), SCell RACH, and SRS. However, the Tx UE 305 prioritizes PCell RACH over SL data transmission.

In some embodiments, the Tx UE 305 compares the SL data priority against a configured SL threshold (i.e., sl-PriorityThreshold-UL-URLLC) and—if the SL data priority is higher than the threshold-prioritizes the higher priority SL data over PUCCH carrying NACK in a HARQ feedback report. Moreover, the Tx UE 305 may prioritize UL HARQ as compared to PSSCH carrying SL data.

Figure 7:
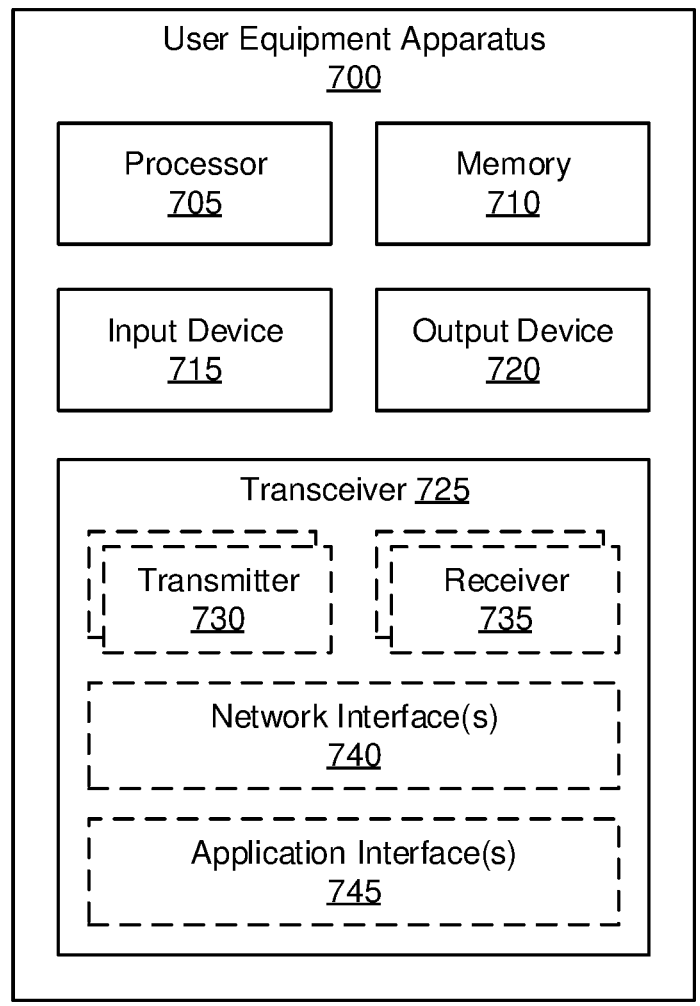
FIG. 7 is a block diagram illustrating one embodiment of a user equipment apparatus that may be used for determining which transmission to prioritize between overlapping SL and UL transmissions.

FIG. 7 depicts a user equipment apparatus 700 that may be used for determining which transmission to prioritize between overlapping SL and UL transmissions, according to embodiments of the disclosure. In various embodiments, the user equipment apparatus 700 is used to implement one or more of the solutions described above. The user equipment apparatus 700 may be one embodiment of the remote unit 105 and/or the UE 205, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panels supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725. In certain embodiments, the processor 705 may include an application processor (also known as "main processor") which manages application-domain and operating system ("OS") functions and a baseband processor (also known as "baseband radio processor") which manages radio functions.

In various embodiments, the processor 705 controls the user equipment apparatus 700 to implement the above described UE behaviors. For example, the processor 705 may identify a sidelink transmission and an uplink transmission planned for an overlapping time and determine a transmission type of the sidelink transmission and of the overlapping uplink transmission.

The processor 705 prioritizes the uplink transmission over the sidelink transmission in response to the transmission type of the uplink transmission being a random-access procedure message for a primary cell, where a priority of the sidelink feedback is associated with a priority of the corresponding TB. Here, prioritizing the uplink transmission includes one of: dropping the sidelink transmission and reducing a transmission power of the sidelink transmission during the overlap. The processor 705 prioritizes the sidelink transmission over the uplink transmission in response to the transmission type of the uplink transmission being a reference signal transmission. Here, prioritizing the sidelink transmission includes one of: dropping the uplink transmission and reducing a transmission power of the uplink transmission during the overlap.

In some embodiments, the processor 705 prioritizes the sidelink transmission over the uplink transmission in response to the transmission type of the sidelink transmission being a sidelink feedback channel and the transmission type of the uplink transmission not being a random-access procedure message for the primary cell.

In some embodiments, the processor 705 prioritizes the sidelink transmission over the uplink transmission in response to the transmission type of the uplink transmission being an uplink SR that is not triggered by a sidelink CSI report, where the priority of SR is associated with that of the logical channel that triggered the SR. In some embodiments, the processor 705 prioritizes the sidelink transmission over the uplink transmission in response to the transmission type of the sidelink transmission being a sidelink feedback channel and the transmission type of the uplink transmission being an uplink CSI report, where the uplink CSI transmission uses PUCCH, PUSCH, or a combination of both.

In some embodiments, the sidelink transmission comprises a control channel transmission. In such embodiments, the processor 705 further prioritizes the sidelink transmission over the uplink transmission in response to the sidelink channel being associated with a higher priority than the uplink transmission. In certain embodiments, the sidelink transmission further comprises a data transmission. In such embodiments, the processor 705 determines a priority of the sidelink transmission based on a highest priority (i.e., lowest priority value) of the control channel transmission and the data transmission.

In some embodiments, the sidelink transmission comprises a data transmission. In such embodiments, the processor 705 may further compare a sidelink data priority to a configured threshold (i.e., sl-PriorityThreshold-UL-URLLC) and prioritize the sidelink transmission in response to the sidelink data priority being greater than the threshold.

In some embodiments, the sidelink transmission comprises a data transmission and the transmission type of the uplink transmission is a HARQ feedback report using PUCCH. In such embodiments, the processor 705 may further compare a sidelink data priority to a TB priority and prioritize the sidelink transmission over the uplink transmission in response to the sidelink channel being associated with a higher priority than the uplink transmission. Note that a PUCCH transmission with a sidelink HARQ-ACK information report has higher priority than a SL transmission if a priority value of the PUCCH is smaller than a priority value of the SL transmission (recall that lower priority values indicate higher priority). If the priority value of the PUCCH transmission is larger than the priority value of the SL transmission, then the SL transmission has higher priority.

In some embodiments, the processor 705 prioritizes a transmission of a physical channel carrying multiple HARQ feedback reports containing HARQ feedback from multiple TBs compared to that of a physical channel carrying a single HARQ feedback report. In some embodiments, the processor 705 prioritizes a transmission carrying multiple HARQ feedback reports. In some embodiments, the processor 705 prioritizes the sidelink transmission over the uplink transmission in response to the transmission type of the uplink transmission being a random-access procedure message for a secondary cell.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to determining which transmission to prioritize between overlapping SL and UL transmissions. For example, the memory 710 may store various parameters, panel/beam configurations, resource assignments, policies, and the like as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein, and one or more receivers 735 may be used to receive DL communication signals from the base unit 121, as described herein. Similarly, one or more transmitters 730 and one or more receivers 735 may be used to send/receive SL communication signals from at least one Rx UE, as described herein.

Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, the transceiver 725 is operable on an uplink channel and on a sidelink channel. In certain embodiments, the transceiver 725 is capable of simultaneous transmission on both the uplink channel and the sidelink channel. However, due to transmit power constraints the processor 705 must deprioritize either a sidelink transmission or an uplink transmission when the sidelink transmission overlaps with the uplink transmission in the time domain (i.e., by reducing a transmission power of the deprioritized transmission). In other embodiments, the transceiver 725 is not capable of simultaneous transmission on both the uplink channel and the sidelink channel. Here, the processor must deprioritize either a sidelink transmission or an uplink transmission when the sidelink transmission overlaps with the uplink transmission in the time domain (i.e., by dropping the deprioritized transmission).

Examples of the sidelink ("SL") transmission include, but are not limited to, control channel transmission such as PSFCH, SL CSI report in SL MAC CE, SL MAC CE, etc., combined SL feedback and SL data transmission, and SL data/PSSCH transmission. Examples of the uplink ("UL") transmission include, but are not limited to, RACH transmission, SRS transmission, SR transmission, PUCCH transmission (e.g., PUCCH UL HARQ feedback (i.e., ACK/NACK), PUCCH SL HARQ feedback (i.e., ACK/NACK), PUCCH CSI, aperiodic PUCCH, etc.), and PUSCH transmission (e.g., MAC CE, PUSCH UL HARQ feedback (i.e., ACK/NACK), PUSCH CSI, PUSCH SL HARQ feedback (i.e., ACK/NACK)).

In various embodiments, one or more transmitters 730 and/or one or more receivers 735 may be implemented and/or integrated into a single hardware component, such as a multi-transceiver chip, a system-on-a-chip, an ASIC, or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
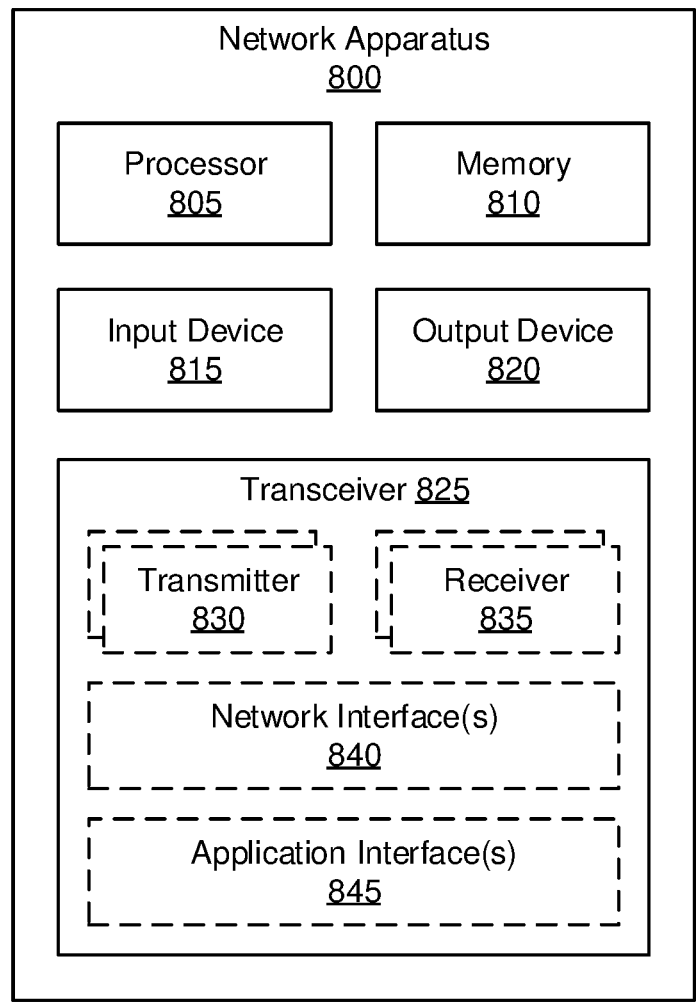
FIG. 8 is a block diagram illustrating one embodiment of a network equipment apparatus that may be used for determining which transmission to prioritize between overlapping SL and UL transmissions.

FIG. 8 depicts a network equipment apparatus 800 that may be used for determining which transmission to prioritize between overlapping SL and UL transmissions, according to embodiments of the disclosure. In one embodiment, network equipment apparatus 800 may be one implementation of a RAN node, such as the base unit 121, the RAN node 210, or gNB, described above. Furthermore, the base network equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network equipment apparatus 800 may not include any input device 815 and/or output device 820. In various embodiments, the network equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the network equipment apparatus 800 is a RAN node (e.g., gNB) that sends UE configurations and receives measurement reports, as described herein. In such embodiments, the processor 805 controls the network equipment apparatus 800 to perform the above described behaviors. When operating as a RAN node, the processor 805 may include an application processor (also known as "main processor") which manages application-domain and operating system ("OS") functions and a baseband processor (also known as "baseband radio processor") which manages radio functions.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to determining which transmission to prioritize between overlapping SL and UL transmissions. For example, the memory 810 may store parameters, configurations, resource assignments, policies, and the like, as described above. In certain embodiments, the memory 810 also stores program code and related data, such as an operating system or other controller algorithms operating on the remote unit 85.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the PLMN and/or RAN, as described herein. Although only one transmitter 830 and one receiver 835 are illustrated, the network equipment apparatus 800 may have any suitable number of transmitters 830 and receivers 835. Further, the transmitter(s) 830 and the receiver(s) 835 may be any suitable type of transmitters and receivers.

Figure 9:
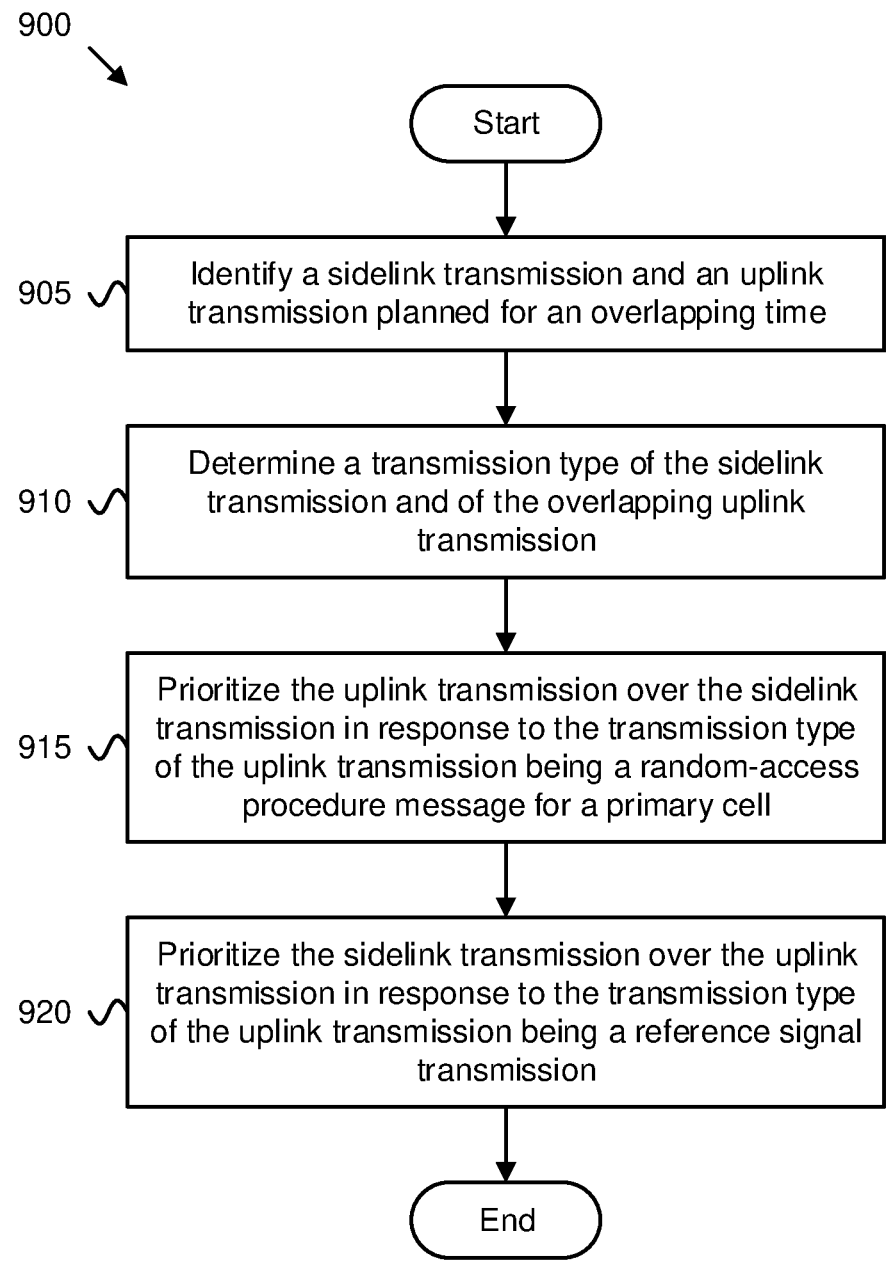
FIG. 9 is a flowchart diagram illustrating one embodiment of a method for determining which transmission to prioritize between overlapping SL and UL transmissions.

FIG. 9 depicts one embodiment of a method 900 for determining which transmission to prioritize between overlapping SL and UL transmissions, according to embodiments of the disclosure. In various embodiments, the method 900 is performed by a user equipment device in a mobile communication network, such as the remote unit 105, the UE 205, and/or the user equipment apparatus 700, described above. In some embodiments, the method 1000 is performed by a processor, such as a microcontroller, a microprocessor, a CPU, a GPU, an auxiliary processing unit, a FPGA, or the like.

The method 900 begins and identifies 905 a sidelink transmission and an uplink transmission planned for an overlapping time. The method 900 includes determining 910 a transmission type of the sidelink transmission and of the overlapping uplink transmission. The method 900 includes prioritizing 915 the uplink transmission over the sidelink transmission in response to the transmission type of the uplink transmission being a random-access procedure message for a primary cell. Here, prioritizing the uplink transmission means either dropping the sidelink transmission or reducing a transmission power of the sidelink transmission during the overlap. The method 900 includes prioritizing 920 the sidelink transmission over the uplink transmission in response to the transmission type of the uplink transmission being a reference signal transmission. Here, prioritizing the sidelink transmission means either dropping the uplink transmission or reducing a transmission power of the uplink transmission during the overlap. The method 900 ends.

Disclosed herein is a first apparatus for determining which transmission to prioritize between overlapping SL and UL transmissions, according to embodiments of the disclosure. The first apparatus may be implemented by a user equipment device in a mobile communication network, such as the remote unit 105, the UE 205, and/or the user equipment apparatus 700, described above. The first apparatus includes a processor and a transceiver operable on an uplink channel and on a sidelink channel.

The processor identifies a sidelink transmission and an uplink transmission planned for an overlapping time and determines a transmission type of the sidelink transmission and of the overlapping uplink transmission. The processor prioritizes the uplink transmission over the sidelink transmission in response to the transmission type of the uplink transmission being a random-access procedure message for a primary cell. Here, prioritizing the uplink transmission includes one of: dropping the sidelink transmission and reducing a transmission power of the sidelink transmission during the overlap. The processor prioritizes the sidelink transmission over the uplink transmission in response to the transmission type of the uplink transmission being a reference signal transmission. Here, prioritizing the sidelink transmission includes one of: dropping the uplink transmission and reducing a transmission power of the uplink transmission during the overlap.

In some embodiments, the processor prioritizes the sidelink transmission over the uplink transmission in response to the transmission type of the sidelink transmission being a sidelink feedback channel and the transmission type of the uplink transmission not being a random-access procedure message for the primary cell, where a priority of the sidelink feedback is associated with a priority of the corresponding transport block ("TB").

In some embodiments, the processor prioritizes the sidelink transmission over the uplink transmission in response to the transmission type of the uplink transmission being an uplink scheduling request ("SR") that is not triggered by a sidelink channel state information ("CSI") report, where the priority of SR is associated with that of the logical channel that triggered the SR. In some embodiments, the processor prioritizes the sidelink transmission over the uplink transmission in response to the transmission type of the sidelink transmission being a sidelink feedback channel and the transmission type of the uplink transmission being an uplink CSI report, where the uplink CSI transmission uses PUCCH, PUSCH, or a combination of both.

In some embodiments, the sidelink transmission comprises a control channel transmission. In such embodiments, the processor further prioritizes the sidelink transmission over the uplink transmission in response to the sidelink channel being associated with a higher priority than the uplink transmission. In certain embodiments, the sidelink transmission further comprises a data transmission. In such embodiments, the processor determines a priority of the sidelink transmission based on a highest priority (i.e., lowest priority value) of the control channel transmission and the data transmission.

In some embodiments, the sidelink transmission comprises a data transmission. In such embodiments, the processor may further compare a sidelink data priority to a configured threshold (i.e., sl-PriorityThreshold-UL-URLLC) and prioritize the sidelink transmission in response to the sidelink data priority being greater than the threshold.

In some embodiments, the sidelink transmission comprises a data transmission and the transmission type of the uplink transmission is a hybrid automatic repeat request ("HARQ") feedback report using PUCCH. In such embodiments, the processor may further compare a sidelink data priority to a TB priority and prioritize the sidelink transmission over the uplink transmission in response to the sidelink channel being associated with a higher priority than the uplink transmission.

In some embodiments, the processor prioritizes a transmission of a physical channel carrying multiple HARQ feedback reports containing HARQ feedback from multiple TBs compared to that of a physical channel carrying a single HARQ feedback report. In some embodiments, the processor prioritizes the sidelink transmission over the uplink transmission in response to the transmission type of the uplink transmission being a random-access procedure message for a secondary cell.

Disclosed herein is a first method for determining which transmission to prioritize between overlapping SL and UL transmissions, according to embodiments of the disclosure. The first method may be performed by a user equipment device in a mobile communication network, such as the remote unit 105, the UE 205, and/or the user equipment apparatus 700. The first method includes identifying a sidelink transmission and an uplink transmission planned for an overlapping time and determining a transmission type of the sidelink transmission and of the overlapping uplink transmission. The first method includes prioritizing the uplink transmission over the sidelink transmission in response to the transmission type of the uplink transmission being a random-access procedure message for a primary cell. Here, prioritizing the uplink transmission comprises one of: dropping the sidelink transmission and reducing a transmission power of the sidelink transmission during the overlap. The first method also includes prioritizing the sidelink transmission over the uplink transmission in response to the transmission type of the uplink transmission being a reference signal transmission. Here, prioritizing the sidelink transmission comprises one of: dropping the uplink transmission and reducing a transmission power of the uplink transmission during the overlap.

In some embodiments, the first method includes prioritizing the sidelink transmission over the uplink transmission in response to the transmission type of the sidelink transmission being a sidelink feedback channel and the transmission type of the uplink transmission not being a random-access procedure message for the primary cell, where a priority of the sidelink feedback is associated with a priority of the corresponding TB.

In some embodiments, the first method includes prioritizing the sidelink transmission over the uplink transmission in response to the transmission type of the uplink transmission being an uplink SR that is not triggered by a sidelink CSI report, where the priority of SR is associated with that of the logical channel that triggered the SR. In some embodiments, the first method includes prioritizing the sidelink transmission over the uplink transmission in response to the transmission type of the sidelink transmission being a sidelink feedback channel and the transmission type of the uplink transmission being an uplink CSI report, where the uplink CSI transmission uses PUCCH, PUSCH, or a combination of both.

In some embodiments, the sidelink transmission comprises a control channel transmission. In such embodiments, the first method further includes prioritizing the sidelink transmission over the uplink transmission in response to the sidelink channel being associated with a higher priority than the uplink transmission. In certain embodiments, the sidelink transmission further comprises a data transmission. In such embodiments, the first method further includes determining a priority of the sidelink transmission based on a highest priority (i.e., lowest priority value) of the control channel transmission and the data transmission.

In some embodiments, the sidelink transmission comprises a data transmission. In such embodiments, the first method may further include comparing a sidelink data priority to a configured threshold (i.e., sl-PriorityThreshold-UL-URLLC) and prioritizing the sidelink transmission in response to the sidelink data priority being greater than the threshold.

In some embodiments, the sidelink transmission comprises a data transmission and the transmission type of the uplink transmission is a HARQ feedback report using PUCCH. In such embodiments, the first method may further include comparing a sidelink data priority to a TB priority and prioritizing the sidelink transmission over the uplink transmission in response to the sidelink channel being associated with a higher priority than the uplink transmission.

In some embodiments, the first method includes prioritizing a transmission of a physical channel carrying multiple HARQ feedback reports containing HARQ feedback from multiple TBs compared to that of a physical channel carrying a single HARQ feedback report. In some embodiments, the first method includes prioritizing the sidelink transmission over the uplink transmission in response to the transmission type of the uplink transmission being a random-access procedure message for a secondary cell.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a User Equipment ("UE"), the method comprising:

identifying an overlap between a sidelink transmission and an uplink transmission, the sidelink transmission comprising a control channel transmission and a data transmission;

determining a transmission type of the sidelink transmission and of the uplink transmission;

prioritizing the uplink transmission over the sidelink transmission in response to the transmission type of the uplink transmission being a random-access message for a primary cell, wherein prioritizing the uplink transmission comprises one of: dropping the sidelink transmission and reducing a transmission power of the sidelink transmission during the overlap; and prioritizing the sidelink transmission over the uplink transmission in response to the sidelink transmission being associated with a higher priority than the uplink transmission and in response to a priority value of the sidelink transmission being smaller than a configured threshold value, wherein the priority value is based on a highest priority of the control channel transmission and the data transmission, and wherein prioritizing the sidelink transmission comprises one of: dropping the uplink transmission and reducing a transmission power of the uplink transmission during the overlap.

2. The method of claim 1, wherein the sidelink transmission comprises a sidelink feedback corresponding to a transport block ("TB"), wherein the priority value of the sidelink feedback is associated with a priority of the corresponding TB.

3. The method of claim 1, wherein the sidelink transmission comprises sidelink data transmitted on a Physical Sidelink Shared Channel ("PSSCH") and feedback transmitted on a Physical Sidelink Feedback Channel ("PSFCH"), wherein to determine whether the priority value of the sidelink transmission is smaller than the configured threshold value, the method comprises identifying a smallest priority value among the PSSCH and the PSFCH and comparing the smallest priority value to the configured threshold value.

4. The method of claim 1, further comprising prioritizing the sidelink transmission over the uplink transmission in response to the transmission type of the sidelink transmission being a sidelink feedback channel and the transmission type of the uplink transmission being an uplink channel state information ("CSI") report, wherein the uplink transmission uses at least one of: Physical Uplink Control Channel ("PUCCH") and Physical Uplink Shared Channel ("PUSCH").

5. The method of claim 1, further comprising prioritizing a transmission of a physical channel carrying multiple Hybrid Automatic Repeat Request ("HARQ") feedback reports containing HARQ feedback from multiple transport blocks ("TBs") compared to that of a physical channel carrying a single HARQ feedback report.

6. The method of claim 1, wherein prioritizing the sidelink transmission over the uplink transmission further occurs in response to the transmission type of the uplink transmission not being a random-access procedure message for the primary cell.

7. The method of claim 1, wherein the transmission type of the uplink transmission is a hybrid automatic repeat request ("HARQ") feedback report using Physical Uplink Control Channel ("PUCCH"), the method further comprising comparing a sidelink data priority to a transport block ("TB") priority.

8. The method of claim 1, further comprising prioritizing the sidelink transmission over the uplink transmission in response to the transmission type of the uplink transmission being a random-access procedure message for a secondary cell.

9. A User Equipment ("UE"), comprising:
at least one memory; and
at least one processor coupled with the at least one memory and configured to cause the UE to:
identify an overlap between a sidelink transmission and an uplink transmission, the sidelink transmission comprising a control channel transmission and a data transmission;
determine a transmission type of the sidelink transmission and of the uplink transmission;
prioritize the uplink transmission over the sidelink transmission in response to the transmission type of the uplink transmission being a random-access message for a primary cell, wherein prioritizing the uplink transmission comprises one of: dropping the sidelink transmission and reducing a transmission power of the sidelink transmission during the overlap; and
prioritize the sidelink transmission over the uplink transmission in response to the sidelink transmission being associated with a higher priority than the uplink transmission and in response to a priority value of the sidelink transmission being smaller than a configured threshold value, wherein the priority value is based on a highest priority of the control channel transmission and the data transmission, and wherein prioritizing the sidelink transmission comprises one of: dropping the uplink transmission and reducing a transmission power of the uplink transmission during the overlap.

10. The UE of claim 9, wherein the sidelink transmission comprises a sidelink feedback corresponding to a transport block ("TB"), wherein the priority value of the sidelink feedback is associated with a priority of the corresponding TB.

11. The UE of claim 9, wherein the sidelink transmission comprises sidelink data transmitted on a Physical Sidelink Shared Channel ("PSSCH") and feedback transmitted on a Physical Sidelink Feedback Channel ("PSFCH"), wherein to determine whether the priority value of the sidelink transmission is smaller than the configured threshold value, the at least one processor is configured to cause the UE to identify a smallest priority value among the PSSCH and the PSFCH and compares the smallest priority value to the configured threshold value.

12. The UE of claim 9, wherein the at least one processor is configured to cause the UE to prioritize the sidelink transmission over the uplink transmission in response to the transmission type of the sidelink transmission being a sidelink feedback channel and the transmission type of the uplink transmission being an uplink channel state information ("CSI") report, wherein the uplink transmission uses at least one of: Physical Uplink Control Channel ("PUCCH") and Physical Uplink Shared Channel ("PUSCH").

13. The UE of claim 9, wherein the at least one processor is configured to cause the UE to prioritize a transmission of a physical channel carrying multiple Hybrid Automatic Repeat Request ("HARQ") feedback reports containing HARQ feedback from multiple transport blocks ("TBs") compared to that of a physical channel carrying a single HARQ feedback report.

14. The UE of claim 9, wherein the at least one processor is configured to cause the UE to prioritize the sidelink transmission over the uplink transmission further in response to the transmission type of the uplink transmission not being a random-access procedure message for the primary cell.

15. The UE of claim 9, wherein the transmission type of the uplink transmission is a hybrid automatic repeat request ("HARQ") feedback report using Physical Uplink Control Channel ("PUCCH"), and wherein the at least one processor is configured to cause the UE to compare a sidelink data priority to a transport block ("TB") priority.

16. The UE of claim 9, wherein the at least one processor is configured to cause the UE to prioritize the sidelink transmission over the uplink transmission in response to the transmission type of the uplink transmission being a random-access procedure message for a secondary cell.

* * * * *